United States Patent
Nakamura et al.

[11] Patent Number: 5,879,416
[45] Date of Patent: *Mar. 9, 1999

[54] METHOD OF MANUFACTURING BATTERY HAVING POLYGONAL CASE

[75] Inventors: Masaya Nakamura; Norikazu Hosokawa, both of Nagoya; Manabu Yamada, Okazaki, all of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 611,401

[22] Filed: Mar. 6, 1996

[30] Foreign Application Priority Data

| Mar. 13, 1995 | [JP] | Japan | 7-052521 |
| Mar. 14, 1995 | [JP] | Japan | 7-054652 |
| Mar. 15, 1995 | [JP] | Japan | 7-056314 |
| Dec. 20, 1995 | [JP] | Japan | 7-331873 |
| Dec. 20, 1995 | [JP] | Japan | 7-331888 |
| Dec. 20, 1995 | [JP] | Japan | 7-331899 |

[51] Int. Cl.[6] .............. H01M 2/04; B23K 26/00
[52] U.S. Cl. .......................... 29/623.2; 219/21.64
[58] Field of Search ............. 29/623.2; 219/121.64, 219/121.63; H01M 2/02

[56] References Cited

FOREIGN PATENT DOCUMENTS

| 61-119255 | 7/1986 | Japan . |
| 4-196049 | 7/1992 | Japan . |
| 5-274977 | 10/1993 | Japan . |
| 6-054660 | 7/1994 | Japan . |
| 7-099043 | 4/1995 | Japan . |
| 7-183011 | 7/1995 | Japan . |

*Primary Examiner*—John S. Maples
*Attorney, Agent, or Firm*—Pillsbury Madison & Sutro LLP

[57] ABSTRACT

A rectangular case of a battery has cover, which is inserted into an open end of the case with the peripheral edge thereof butted against an inner periphery of the case, forming an interface to be welded. In order to form an equal weld penetration depth, the welding of the corners of the weld interface and straight sides thereof is carried out differently. For example, when the corner of the weld interface is welded, the laser beam is aimed at a portion offset outside the corner of the weld interface while the laser beam is applied right on the weld interface when the straight side is welded. Each portion on the straight sides is, preferably, welded before the above main welding for temporary setting.

14 Claims, 15 Drawing Sheets

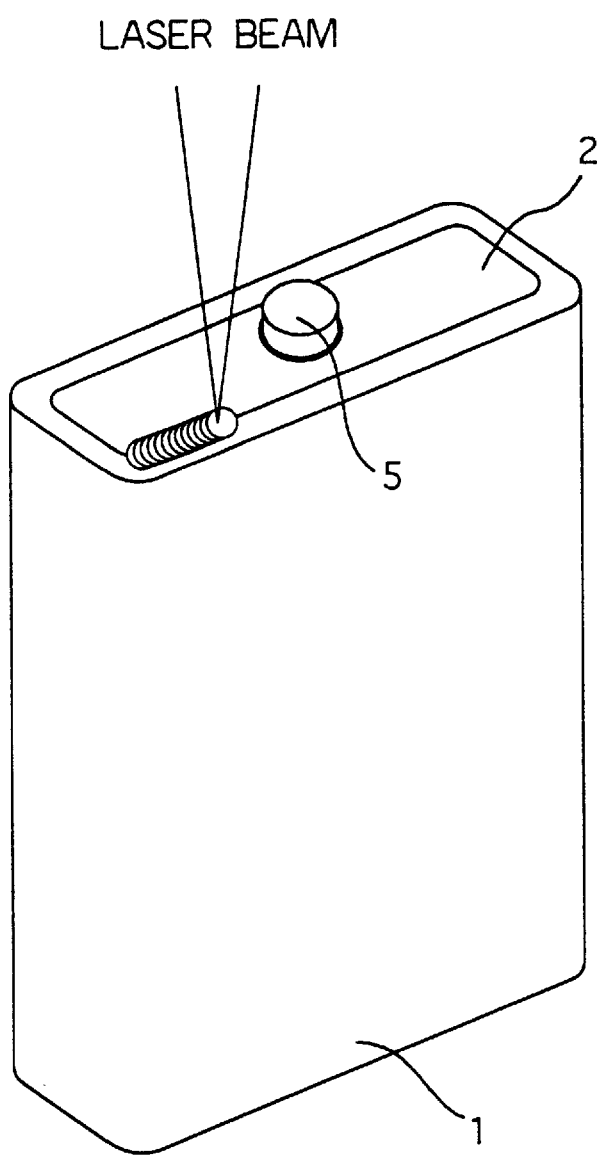

METHOD OF MANUFACTURING BATTERY HAVING POLYGONAL CASE

CROSS REFERENCE TO RELATED APPLICATION

The present application is based on and claims priority from Japanese Patent Applications No. Hei 7-052521 filed on Mar. 13, 1995 and No. Hei 7-054652 filed on Mar. 14, 1995, Hei 7-056314 filed on Mar. 15, 1995 and No. Hei 7-331873 filed on Dec. 20, 1995, Hei 7-331888 filed on Dec. 20, 1995 and No. Hei 7-331899 filed on Dec. 20, 1995, the contents of which are incorporated herein by reference.

BACKGROUND OF THE INVENTION

1. Field of the Invention

The present invention relates to a method of manufacturing a battery having a polygonal case and, more particularly, relates to a welding method of a polygonal battery case.

2. Description of the Related Art

Japanese Patent Laid Open No. 6-54660 discloses a battery having a rectangular metal case, which has a cover plate welded to an open end of the case by a laser beam welding device. The rectangular case is placed on a table, which moves a set time before the laser welding is started and continues to move for a while after the laser welding is completed in order to provide equal welding speed. A rectangular battery is, generally, effective to save the mounting space, and the laser beam welding provides good working efficiency without causing bad influence on the electrolyte and insulators of the battery as compared with other welding methods.

In general, since the rectangular battery case is formed from a metal plate to have corners with small curvature, the cover plate is also formed to have the corresponding corners with small curvature.

Some of the above described batteries, however, have problems of electric short circuiting, leaking of the electrolyte and other sealing problems.

The laser welding is usually carried out, as shown in FIG. 20, with a spot welding 201 along the interface line (hereinafter referred to as the weld interface) of the open end of the case 10 and outer edge of the cover 2 at a constant speed with regulated power. The straight line of the rectangular weld interface 200 is, therefore, melted to form a weld penetration area (portion melted by welding and thereafter becomes solid) having a V-shaped cross-section. On the other hand, the corners 202 of the rectangular weld interface 200 are melted more to have deeper V-shaped cross-section than the straight sides due to increase of the welding power per unit area, and the bottom of the V-shaped cross-section shifts to the inside due to difference in length between the outer periphery and the inner periphery of the weld bead 200 shown in FIG. 20, whereby a melted metal piece of the welded penetration area may get into the electrolyte contained inside the case and cause short circuiting, leakage of the electrolyte or breakdown of the battery.

In addition, when the cover 2 is put on the open end of the case 10 to be welded to the case 1 as shown in FIG. 21, the weld interface loses rigidity and the cover 2 may fall into the inside of the case 10 or pinholes may be formed in the weld interface.

If the case 1 is made of a thin metal plate, sags of the weld beads may be formed on a peripheral portion of the open end of the case 10 as shown in FIG. 22.

SUMMARY OF THE INVENTION

The present invention is made in view of the foregoing problems, and has a primary object of providing an improved method of welding a polygonal open end of a battery case and a cover together by a laser beam welder.

Another object of the present invention is to provide an improved method of manufacturing a battery having a polygonal metal case and a polygonal metal cover butted against inner periphery of an open end of the case thereby forming a polygonal interface to be welded with the metal case, the method comprising steps of checking whether a portion to be welded by a laser beam is located in one of corners of the polygonal weld interface and applying the laser beam to the portion to be welded when the portion to be welded is not located in one of the corners and to an offset portion located outside the portion to be welded when the portion to be welded is located in one of the corners so as to receive laser power equally, thereby forming weld penetration area having an equal depth in the welded portion.

If the area of weld penetration around the corner of the weld interface shifts to the inside of the case and the bottom of the V-shaped cross-section of the weld penetration shifts to the inside, the bottom remains in the wall of the case so that the spatters of the welding may be prevented from getting in the inside of the battery.

The step of holding the metal case may comprise a step of securing the case on a X-Y table, and the step of applying the laser beam comprises a step of moving the X-Y table.

The above method of the present invention may have a preparatory step of applying a laser beam at least one portion of straight sides of the weld interface for temporary setting before the main step of welding with the laser beam. The preparatory step may comprise a preparatory step of applying the laser beam to a portion of all the straight sides.

BRIEF DESCRIPTION OF THE DRAWINGS

Other objects, features and characteristics of the present invention as well as the functions of related parts of the present invention will become clear from a study of the following detailed descriptions, the appended claims and the drawings. In the drawings:

FIG. 2 is a perspective view illustrating a battery having a rectangular case on which the method according to the first embodiment is applied;

DETAILED DESCRIPTION OF THE PREFERRED EMBODIMENTS

(First Embodiment)

A first embodiment is described with reference to FIG. 1, FIG. 2, FIG. 5 and FIG. 6.

A battery container is composed of a metal rectangular case 1 and a metal cover 2, which are hermetically welded together by a laser welder, and a positive battery terminal 5 fixed to a central portion of the cover 2 via an insulator as shown in FIG. 2.

The rectangular case 1 can be made of a nickel-plated steel plate and accommodates therein positive active-material made from lithium-cobalt oxide, separators, negative active-material made from carbon and battery elements.

Figure 6:
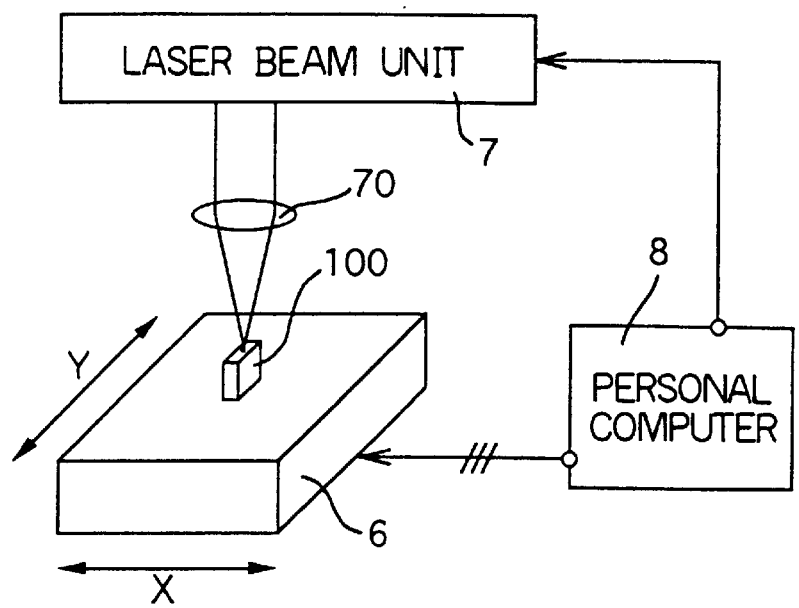
FIG. 6 is a diagrammatic view illustrating a pulse type laser-welder used for the embodiments of the present invention.

The cover 2 is made of a steel plate and is nickel-plated except the edge portion thereof. The cover 2 is press-fitted to an opening of the case 1 with the edge of the cover 2 butted against the inner periphery of the case 1. The size of the cover 2 is, preferably, a little, for example 0–0.1 mm, larger than the size of the opening portion of the case 1. Then, the case 1 and the cover 2 are welded together by a pulse type YAG-laser-welder, which is shown in FIG. 6, all over the weld interface 3. Thus, the weld interface 3 includes four straight sides 31 and four corners 32 as shown by way of example in FIG. 1.

The welder is composed of an X-Y (horizontally) moving table 6 which holds a battery assembly 100, a stationary laser beam unit 7 which applies laser pulses vertically on the moving table 6 and a controller 8 which includes a personal computer to control the X-Y table 6 and the laser beam unit 7. A lens 70 is disposed in front of the laser beam unit 7 to condense the laser beam.

The laser beam welding is carried out as follows.

Figure 1:
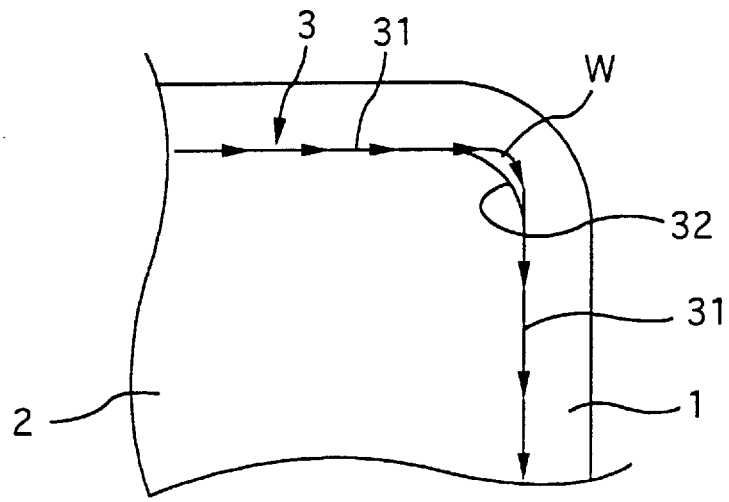
FIG. 1 is a partial plan view of a rectangular battery case and a cover illustrating a laser beam track W formed by a method according to a first embodiment of the present invention.

The battery assembly 100 is placed on the moving table 6, which is controlled by the controller 8 to move from a starting position along one of the straight sides 31 of the weld interface 3 shown in FIG. 1, while the laser beam power is gradually increased. When the laser beam comes to one of the corners 32, the moving table is controlled so that the center of the laser beam spot comes outside the corner 32 of the weld interface 3. In other words, a laser beam track W is formed to have corners whose radius of curvature is smaller than that of the corner 32 of the weld interface 3 as shown in FIG. 1. Thus, if the area of weld penetration around the corner 32 shifts to the inside of the case and the depth dmax of the V-shaped cross-section of the weld penetration shifts to the inside, the bottom remains in the thickness of the case 1 as indicated by a solid line in FIG. 5, so that the spatters of the welding may be prevented from getting in the inside of the battery.

(Second Embodiment)

Figure 3:
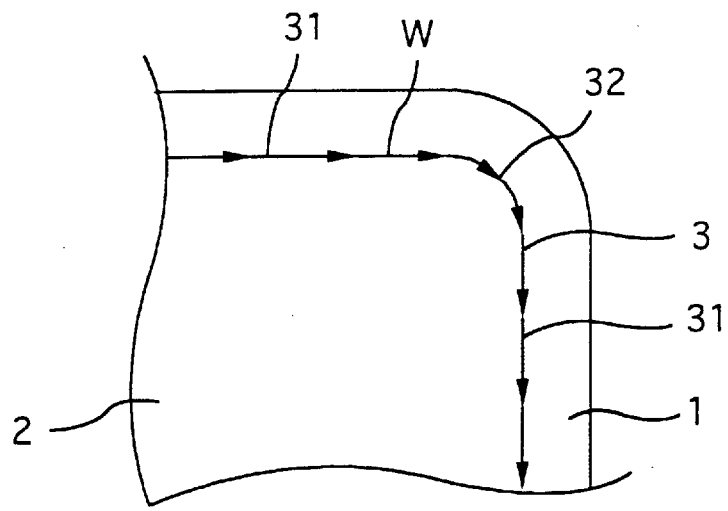
FIG. 3 is a partial plan view of a rectangular case and a cover illustrating a laser beam track W formed by a method according to second, third and fourth embodiments of the present invention.

A second embodiment is described with reference to FIG. 3. Only points different from the first embodiment are described hereafter. The laser beam track W of the second embodiment is substantially located on, or is the same as, the weld interface 3 as shown in FIG. 3, and the laser is applied at an equal speed and an equal interval all over the weld interface 3. In other words, the laser beam track W is formed to have corners whose radius of curvature is equal to that of the corner 32 of the weld interface 3. However, the laser beam power applied each time to the corners 32 of the weld interface 3 by the laser beam unit 7 is reduced by about 5% from the power applied each time to the straight sides 31, so that the depth dmax of the V-shaped cross-section of the weld penetration can be controlled as indicated by a broken line in FIG. 4. When the laser beam comes to or goes out from one of the corners, the laser beam power is reduced or increased stepwise. Thus, the spatters of the welding may be prevented from getting in the inside of the battery.

(Third Embodiment)

A third embodiment is described with reference to FIG. 3 again. The laser beam track W of the second embodiment is located substantially on the weld interface 3 as in the second embodiment shown in FIG. 3. The same laser beam power is applied each time to all over the weld interface 3 at an equal interval. However, the moving speed of the table 6, when the laser is applied to the corners 32 of the weld interface 3, is increased by 10% above the speed of the table 6, when the laser is applied to the straight sides 31 of the weld interface 3. When the laser beam comes to or goes out from one of the corners, the moving speed of the table is increased or decreased stepwise.

Figure 4:
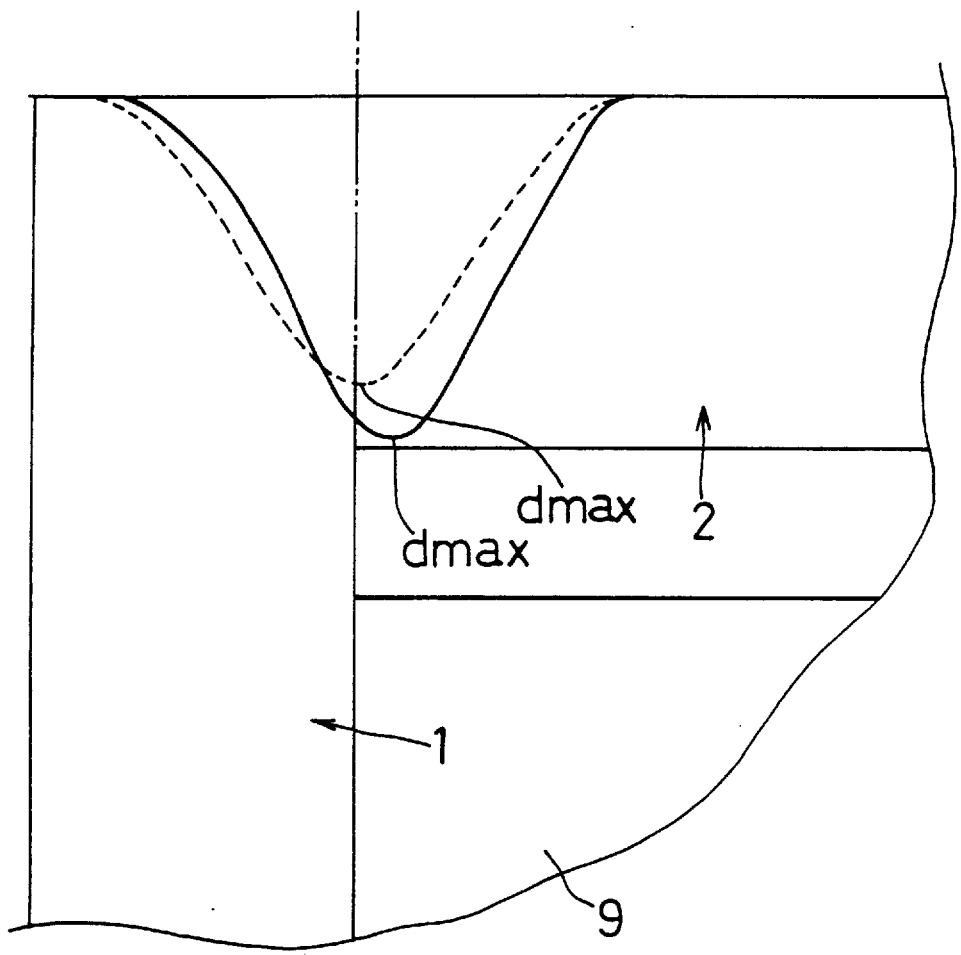
FIG. 4 is a diagrammatic view illustrating an area of weld penetration at a side and a corner of the laser beam track of the case and the cover according to the second embodiment.
Figure 5:
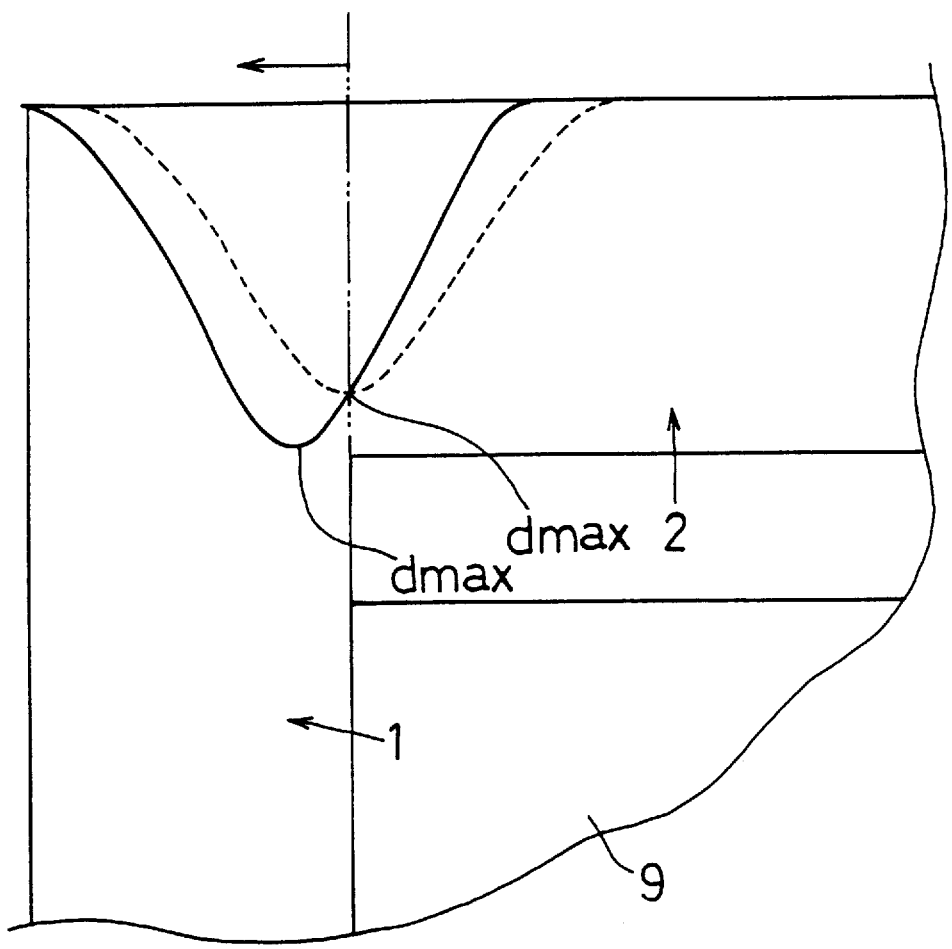
FIG. 5 is a diagrammatic view illustrating an area of weld penetration at a side and a corner of the laser beam track of the case and the cover according to the first embodiment.

As a result, the depth dmax of the V-shaped cross-section of the weld penetration can be controlled as indicated by a broken line in FIG. 4, and the spatters of the welding may be prevented from getting in the inside of the battery.

(Fourth Embodiment)

A fourth embodiment is described with reference to FIG. 3 again. The laser beam track W of the second embodiment is substantially on the weld interface 3 as in the second and third embodiments shown in FIG. 3. The same laser beam power is applied each time to all over the weld interface 3, and the same moving speed of the table is maintained while the laser beam is applied to all over the weld interface 3. However, number of times or the frequency of the pulses of the laser beam applied to the corners 32 of the weld interface 3 is reduced by about 10% from that of the frequency of the laser beam applied to the straight sides 31 of the weld interface 3. When the laser beam comes to or goes out from one of the corners, the time interval between pulses of the laser beam is increased or decreased stepwise.

As a result, the depth dmax of the V-shaped cross-section of the weld penetration can be controlled as indicated by a broken line in FIG. 4, and the spatters due to the welding may be prevented from getting to the inside of the battery.

(Fifth Embodiment)

The laser beam power, moving speed of the table or frequency of the pulses of the laser beam applied to the weld interface is changed stepwise when the laser beam moves between one of the corners and one of the straight sides in the embodiments 2, 3 and 4. However, the laser beam power, moving speed of the table or the frequency of the pulses of the laser beam applied to the weld interface is changed gradually when the laser beam moves between one of the corners and adjacent one of the straight sides in a fifth embodiment. Thus, smoother weld penetration area is provided.

(Sixth Embodiment)

In this embodiment, the radius of the curvature at the corners of the laser beam track W is made smaller than that of the corner 32 of the weld interface 3 as in the first embodiment, and any one of the above described steps to control the depth dmax of the V-shaped cross-section of the weld penetration is adopted.

(Tests)

Test sample:

Rectangular case 1: 34 mm long, 8.5 mm wide, 48 mm high and 0.4 mm thick;

Cover 2: 0.4 mm thick;

The radius of the curvature of the weld interface's corner 32 between the case 1 and the cover 2: 0.5 mm;

Number of the laser beam spots per millimeter (laser beam density) on the straight side 31: 10;

Power of the laser beam per one pulse for the straight side: 2.4 joule;

Moving or scanning speed of the laser beam along the straight side 31: 10 mm/sec; and Diameter of a melting surface area melted by one pulse laser beam: 0.7 mm.

A polypropylene plate is put on the inner surface of the cover 2 to detect the existence of spatters and other thermal influence caused by the laser welding, and leakage of the electrolyte is checked 90 days after the battery was placed with the cover side down.

Test 1:

The radius of the curvature at the corner of the laser beam track W is 0.35 mm, and the laser beam of the same welding conditions for the straight sides 31 are applied to the corners.

Test 2:

The radius of the curvature at the corner of the laser beam track W is the same as the radius of the curvature at the corner 32 of the weld interface (0.5 mm), and the laser beam power applied each time to the corners 32 is reduced by about 5% from the power applied each time to the straight sides 31. Other welding conditions for the corners 32 are the same as those for the straight sides 31.

Test 3:

The radius of the curvature at the corner of the laser beam track W is 0.35 mm, the scanning speed at the corners 32 is 11 mm/sec, the scanning speed at the straight sides is 10 mm/sec and other conditions for the corners are the same as those for the straight sides 31.

Reference (conventional) Sample:

The radius of the curvature at the corner of the laser beam track W is the same as the radius of the curvature at the corner 32 of the weld interface (0.5 mm), and all the welding conditions for the corners 32 are the same as those for the straight sides 31.

Result from Tests on Each 50-Sample Batch:

|  | Existence of Spatters in (%) | Leakage of Electrolyte |
| --- | --- | --- |
| Reference | 6% | 12% |
| Test 1 | 0 | 0 |
| Test 2 | 0 | 0 |
| Test 3 | 0 | 0 |

The scanning control of the laser beam spot is described hereafter.

Figure 7:
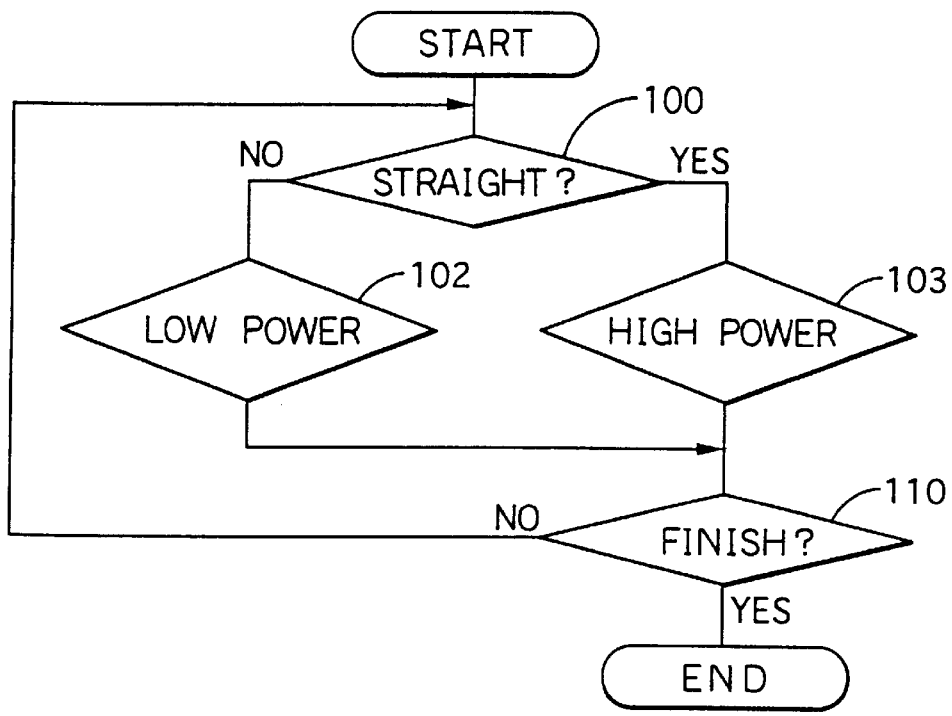
FIG. 7 is a flow chart of laser beam control according to the second embodiment.

Control process 1:

A first control example, which is applied to the second embodiment, is described with reference to a flow chart shown in FIG. 7.

At the beginning in a step 100 after the control process starts, whether the laser beam spot (focal point of the objective lens 70) is controlled by the X-Y table 6 to scan the straight side 31 or not is checked according to a program stored in the computer 8 shown in FIG. 6. Then, the power of the laser pulse is set to a high value PH in a step 103 if the laser beam spot is scanning the straight side 31 (YES). If NO, the laser pulse power is set to a low value PL in a step 102, and the process proceeds to a step 110, where whether or not the welding has been finished is checked. If NO, the process returns to the step 100. If YES, on the other hand, the process ends.

Figure 8:
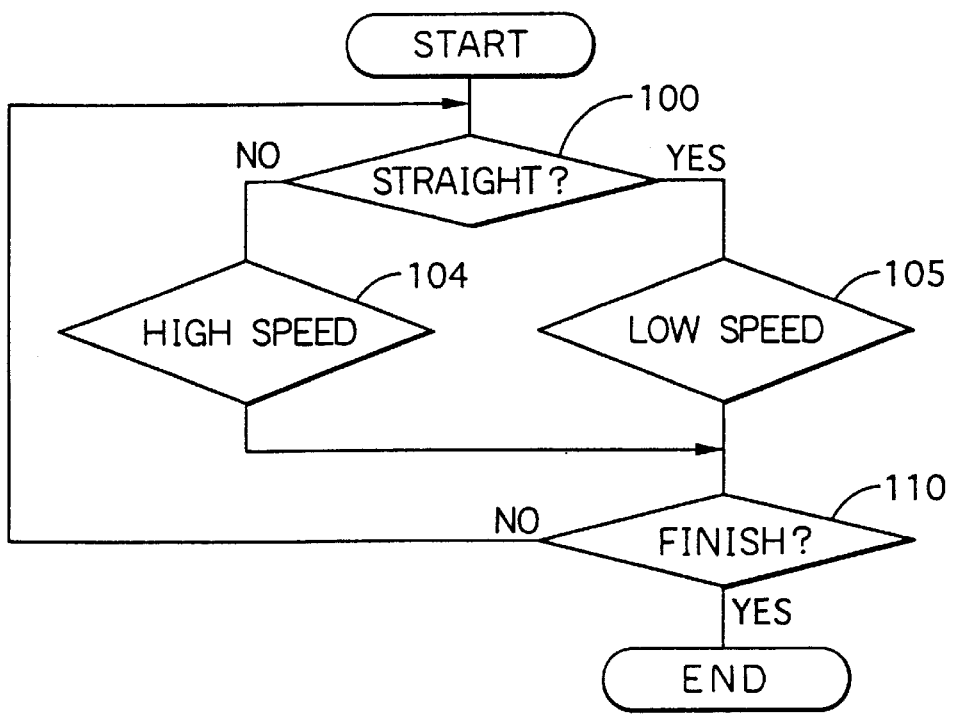
FIG. 8 is a flow chart of laser beam control according to the third embodiment.

Control process 2:

A second control example, which is applied to the third embodiment, is described with reference to a flow chart shown in FIG. 8.

At the beginning in a step 100 after the control process starts, whether the laser beam spot (focal point of the objective lens 70) is scanning the straight side 31 or not is checked according to a program stored in the computer 8. Then, the scanning speed of the laser beam along the laser beam track W (moving speed of the X-Y table) is set to a low value VL in a step 105 if the laser beam spot is scanning the straight side 31 (YES). If the laser beam is scanning the corner, the scanning speed is set to a high value VH in a step 104, and the process proceeds to a step 110, where whether or not the welding has been finished is checked. If NO, the process returns to the step 100. If YES, on the other hand, the process ends.

Figure 9:
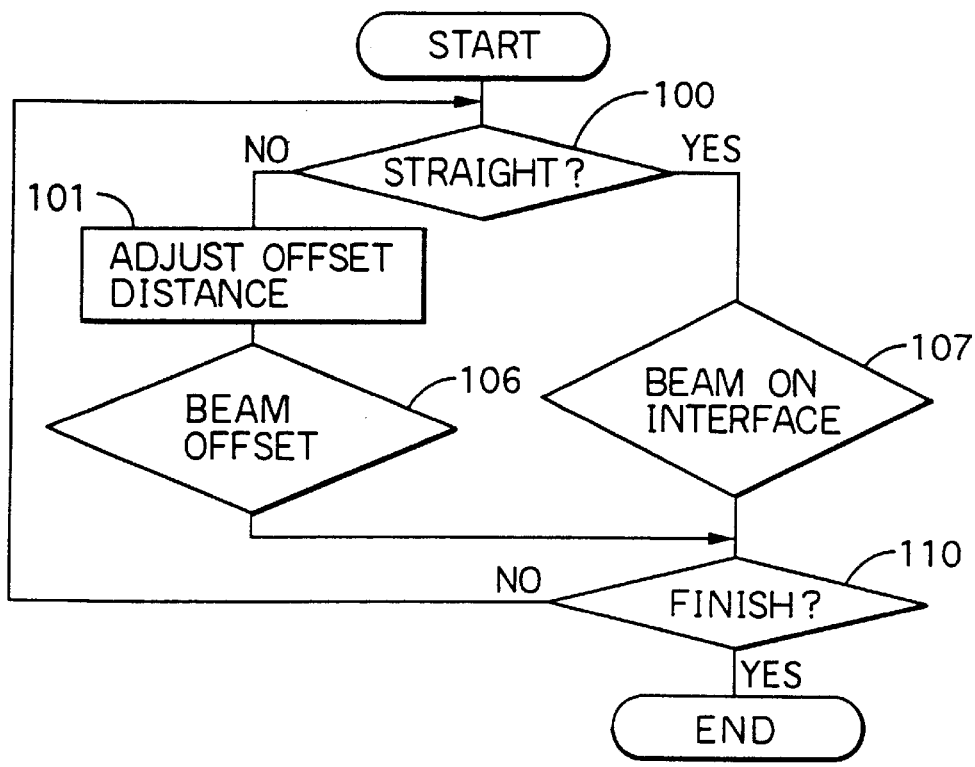
FIG. 9 is a flow chart of laser beam control according to the fifth embodiment.

Control process 3:

A third control example, which is applied to the fifth embodiment, is described with reference to a flow chart shown in FIG. 9.

At the beginning in a step 100 after the control process starts, whether the laser beam spot (focal point of the objective lens 70) is scanning the straight side 31 or not is checked according to a program stored in the computer 8. Then, the laser beam track, which corresponds to a moving route of the X-Y table, is set along the straight side 31 of the weld interface in a step 107 if the laser beam spot is scanning the straight side 31 (YES). If the laser beam is scanning the corner (NO), an offset distance of the laser beam spot is read out from a table stored in a ROM of the computer 8 in a step 101, and the process proceeds to a step 106, where the X-Y table 6 is controlled so that the laser beam is shifted to the outside from the corner 32 of the weld interface 3 by the offset distance.

The table includes relationship between the scanning position of the laser beam approaching the corners 32 of the weld interface 3 and the offset distance from the corner 32 corresponding to the position. The offset distance gradually increases from zero as the laser beam comes into the corner, and becomes a maximum at the middle of the corner and gradually decreases to zero as the laser beam approaches the straight side.

Thereafter, the process proceeds to a step 110, where whether or not the welding has been finished is checked. If NO, the process returns to the step 100. If YES, on the other hand, the process ends.

Figure 10:
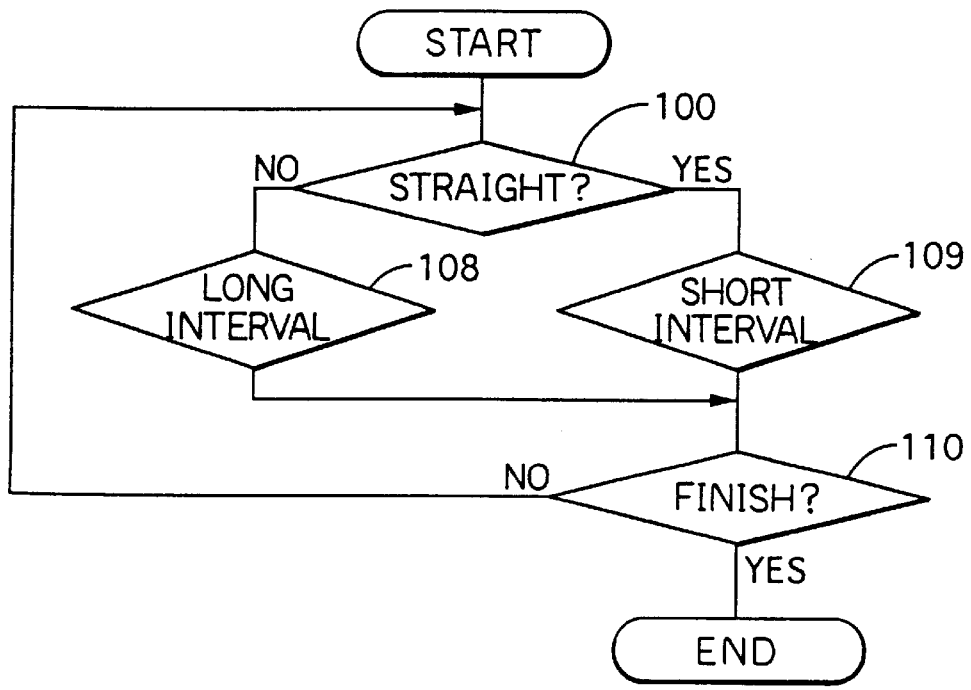
FIG. 10 is a flow chart of laser beam control according to the fourth embodiment.

Control process 4:

A fourth control example, which is applied to the fourth embodiment, is described with reference to a flow chart shown in FIG. 10.

At the beginning, the X-Y table 6 is controlled in a well-known manner so that the laser beam spot (the focal point of objective lens 70) can move along the weld interface 3 of the battery assembly 100 at a constant speed.

Then, whether the laser beam spot is scanning a portion near the straight side 31 or not is checked according to a program stored in the computer 8 in a step 100, and the pulse interval of the laser beam is set to a short period TS in a step 109 if the laser beam spot is scanning the straight side 31 (YES). If, on the other hand, the laser beam is scanning the corner, the pulse interval is set to a long period TL in a step 108, and the process proceeds to a step 110, where whether or not the welding has been finished is checked. If NO, the process returns to the step 100. If, on the other hand, YES, the process ends.

Figure 11:
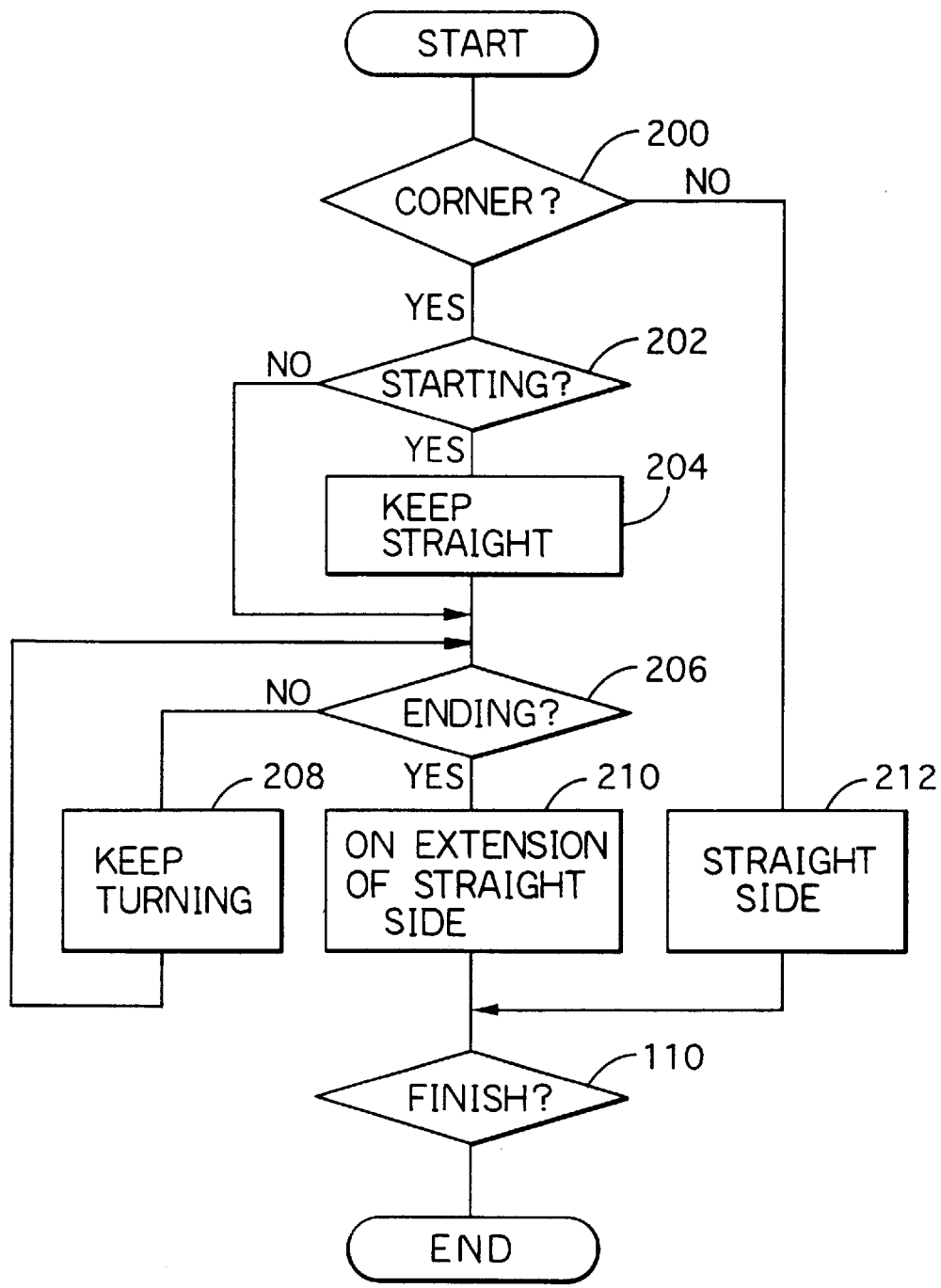
FIG. 11 is a flow chart of laser beam control according to the first embodiment.

Control process 5:

A fifth control example, which is applied to the first embodiment, is described with reference to a flow chart shown in FIG. 11.

At the beginning in a step 200, whether the laser beam spot (focal point of the objective lens 70) is scanning near one of the corners 32 or not is checked. If the laser beam spot is scanning near one of the straight sides 31 (NO), the X-Y table 6 is controlled so that the laser beam spot can scan right along the straight sides 31 in a step 212. On the other hand, if the laser beam spot is scanning near one of the corners 32, whether or not the laser beam is located at the starting point of the corner is checked in a step 202. If YES, the X-Y table is controlled so that the laser beam goes straight in a step 204, which is followed by a step 206. If, on the other hand, NO, the process proceeds to a step 206 immediately. Thereafter, whether or not the laser beam is located at an end of the corner 32 is checked in the step 206. If YES, the X-Y table is controlled so that the laser beam goes straight along an extension of a subsequent one of the straight sides 31 in a step 210. If NO, on the other hand, the process proceeds to a step 208, where the X-Y table is controlled so that the laser beam turns around at a set radius which is smaller than the radius of the corner 32 of the weld interface 3, and returns to the step 206 where whether or not the laser beam is located at an end of the corner 32 is checked again. Thereafter, if YES, the process proceeds to a step 110 through the step 210, where whether or not the welding has been finished is checked. If NO, the process returns to the step 100. If YES, on the other hand, the process ends.

(Seventh Embodiment)

Figure 12A:
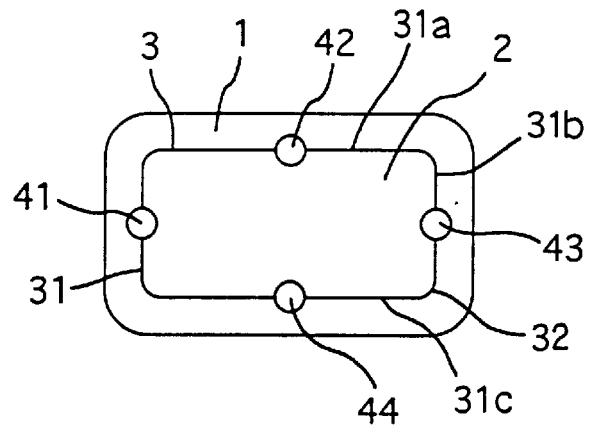
FIGS. 12A and 12B are schematic views illustrating a method of welding a rectangular case of a battery according to a seventh embodiment of the present invention.

Four spots 41 through 44 of the straight sides 31, 31a 31b and 31c of the weld interface 3 formed between the case 1 and the cover 2 are welded by a YAG laser welder for temporary setting at the beginning as shown by way of example in FIG. 12A. The laser beam power is the same as the power applied during the main welding.

Each of the four spots 41 through 44 is located at a middle portion of each of the straight sides 31, 31a, 31b and 31c. However, three spots of the four are sufficient for the temporary setting if each of them is located at one of apexes of a triangle. That is, at least one of the three spots has to be located at a different one of the straight sides.

If the spot 41 of the straight side 31 is welded at the beginning, the spot 43 located at the opposite straight side 31b is welded next and the rest of spots 42 and 44 of the straight sides 31a and 31c are successively welded. Thus, the cover 2 is fixed to the case 1 without displacement or inclination.

Figure 12B:
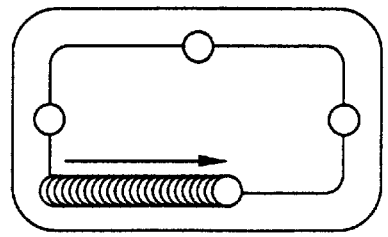

Thereafter, the laser beam is aimed at a starting point and moved along the weld interface until it comes back to the starting point as shown in FIG. 12B. The starting point is preferably located on a portion different from either one of the spots 41 through 44 lest the laser beam at the starting point should melt one of the spots again.

(Eighth Embodiment)

Figure 15:
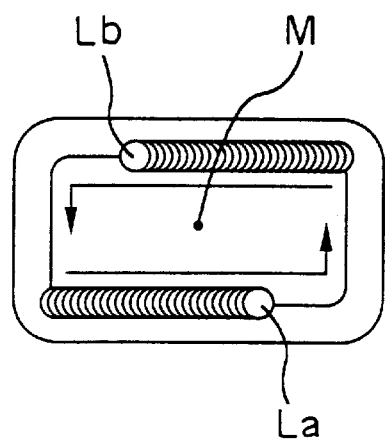
FIG. 15 is a schematic view illustrating a method of welding a rectangular case of a battery welded according to a fifth embodiment of the present invention.

An eighth embodiment is described eighth reference to FIG. 15.

Figure 13:
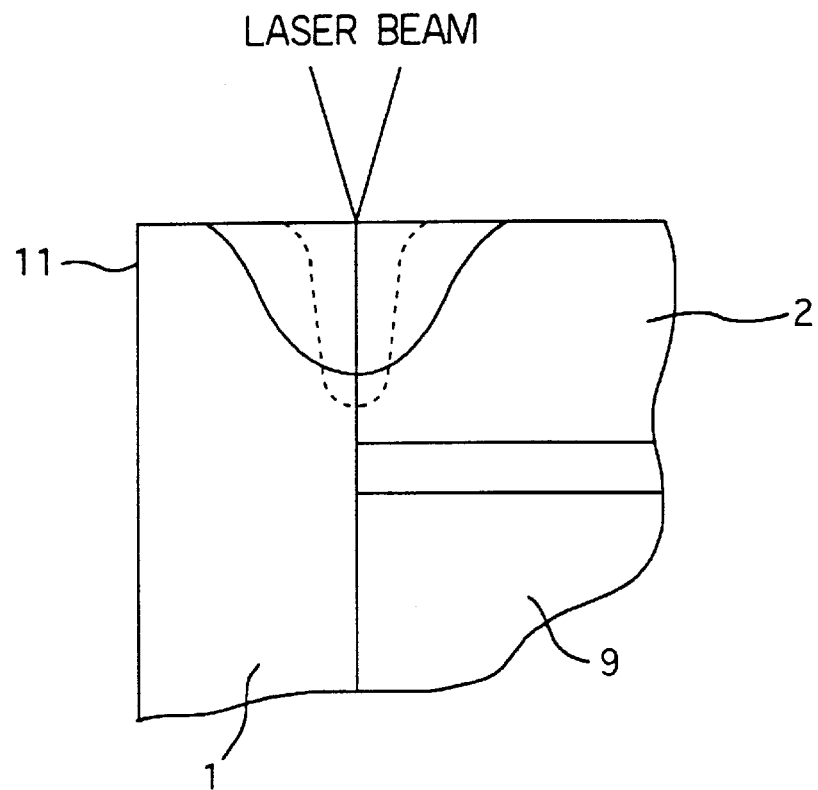
FIG. 13 is a diagrammatic view illustrating an area of weld penetration of the laser beam track of the case and the cover formed by a method according to an eighth embodiment.

A laser beam emitted from one YAG laser welder is divided into two beams La and Lb, which are defocussed as indicated by a solid line shown in FIG. 13 and applied respectively to portions displaced by an angle 180° from each other on the weld interface 3 with respect to a center M of the opening of the rectangular case 1 as shown in FIG. 15. The focussing of laser beam is controlled lest the weld penetration area should not reach the outer periphery of the case 1 or the bottom of the cover as indicated by the solid line shown in FIG. 13. If the laser beam is focussed sharply on the weld interface 3 to form a weld penetration as indicated by a broken line in FIG. 13, position control of the laser beam becomes difficult.

Since the welding is carried out on both sides of the cover 2, pulling force toward the melting portion on both sides of the cover 2 is cancelled. As a result, clearance between the cover 2 and the inner periphery of the case 1 is kept uniform so that high pressure-tightness can be ensured.

Three or more laser beams can be applied to portions on the weld interface in a similar manner to cancel the pulling force caused by the melting.

(Tests)

Sample:

rectangular case 1: 34 mm long, 8.5 mm wide, 48 mm high and 0.4 mm thick;

cover 2: 0.4 mm thick;

The radius of the curvature of the weld interface's corner 32: 0.5 mm;

Number of the laser beam spots per millimeter (laser beam density) on the straight side 31: 10;

Power of the laser beam per one pulse for the straight side: 2.4 joule;

Moving or scanning speed of the laser beam along the straight side 31: 10 mm/sec; and Diameter of a melting area melted by one pulse laser beam: 0.7 mm.

Leakage of the electrolyte is checked 90 days after the battery was placed with the cover side down.

Reference (conventional) Sample: One beam welding without the temporary setting.

Test 4: One beam welding with the temporary setting (seventh embodiment).

Test 5: Two-beam welding without the temporary setting (eighth embodiment)

Result from Experiments on Each 50-Sample Batch:

| | Abnormal Displacement of cover | Abnormal Welding | Abnormal Area of Penetration | Leakage of Electrolyte |
|---|---|---|---|---|
| Reference | 12% | 10% | 16% | 18% |
| Test 4 | 0 | 0 | 0 | 0 |
| Test 5 | 0 | 0 | 0 | 0 |

If a difference in height between a edge portion of the case 1 and the cover 2 is larger than 0.05 mm, the displacement of the cover is regarded as abnormal.

If a crack longer than 30 $\mu$m or a cavity larger than 30 $\mu$m in diameter is found under a microscopic examination in a portion of the laser beam track, the welding is regarded as abnormal.

If a blowhole larger than 30 $\mu$m in diameter is found under the microscopic examination in a cross-sectional surface of the laser beam track which is buffed and etched, the area of weld penetration is regarded as abnormal. The blow hole is a portion which is not welded completely due to abnormally wide gap in the weld interface of the case 1 and the cover 2.

Figure 14:
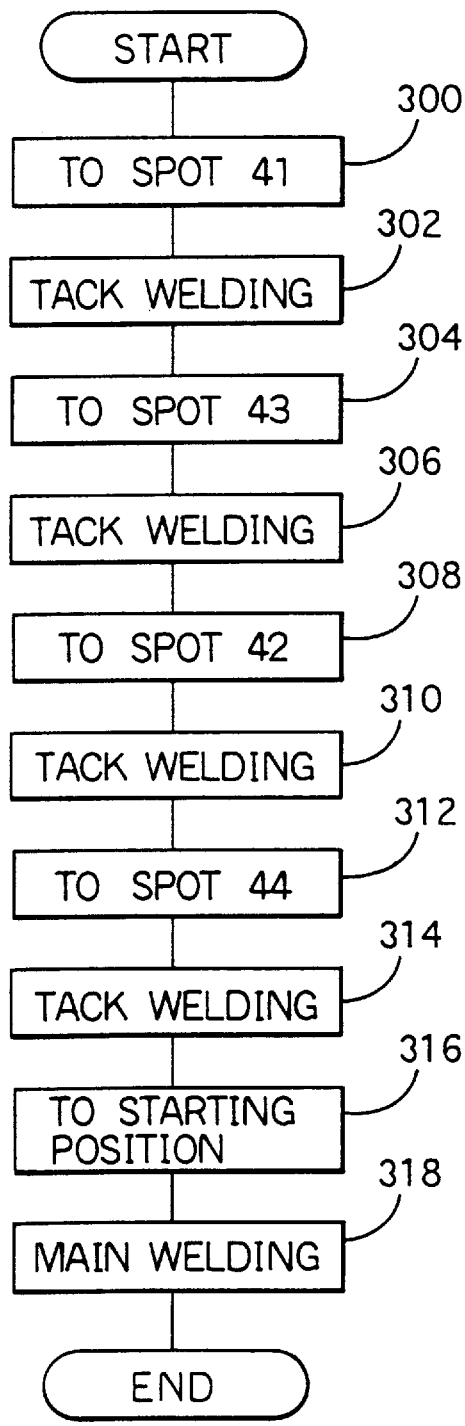
FIG. 14 is a flow chart of laser beam control in a control process 6.

Control process 6:

A process of the welding by the laser welder shown in FIG. 6 is described next with reference to FIG. 14.

The process is controlled by the computer 8.

At the beginning, when the computer 8 is started, the X-Y table 6 is driven to carry the battery assembly 100 so that the laser beam (focal point of the objective lens) comes to a position corresponding to one (e.g. spot 41) of the spots for the temporary setting shown in FIG. 12 in a step 300. Then, a tack welding for the temporary setting is carried out in a step 302. The X-Y table is driven again to carry a second position corresponding to the spot 43 to the laser beam spot shown in FIG. 12 in a step 304, and a tack welding is given to the position in a step 306. Thereafter, the X-Y table is driven to carry the battery assembly 100 so that the laser beam is applied to a position corresponding to the spot 42 in a step 308, and a tack welding is given thereto in a step 310. Thereafter, the X-Y table is driven so that the laser beam is applied to a position corresponding to the spot 44 in a step 312 and a tack welding is given thereto in a step 314. Subsequently, the X-Y table is driven back to bring the battery assembly back to the starting position for the main welding of the weld interface 3 in a step 316, and the main welding is carried out in a step 318, which is described in connection with the previous embodiments.

(Ninth Embodiment)

A ninth embodiment is described with reference to FIG. 16 and FIG. 17.

Figure 16:
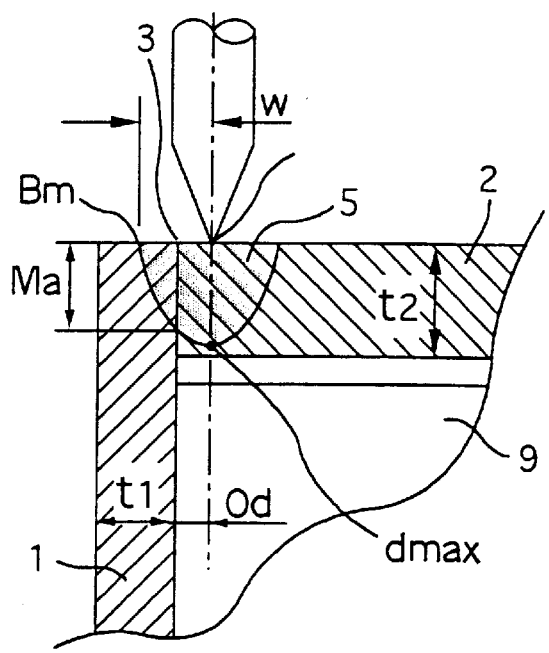
FIG. 16 is a diagrammatic view illustrating an area of weld penetration of the laser beam track of the case and the cover acording to a ninth embodiment.
Figure 20:
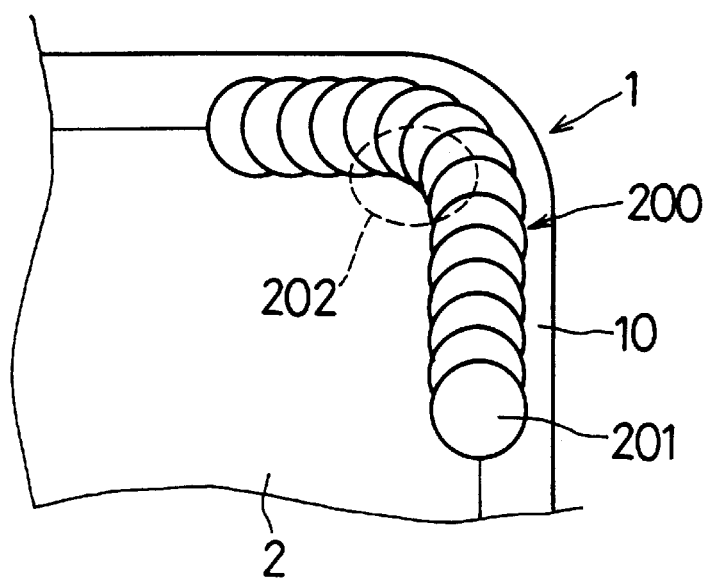
FIG. 20 is a schematic view illustrating a conventional method of welding a rectangular case of a battery.

A rectangular case 1 is made of a nickel-plated steel plate and 16 mm wide, 7.5 mm long and 83.5 mm high and 0.3 mm thick as shown in FIG. 16. A cover 2 is made of a nickel-plated steel plate and 15.4 mm wide, 6.9 mm long and 0.6 mm thick. The case 1 and the cover 2 may be made of a stainless steel plate.

The laser beam is irradiated at an interval of 100 pulses in a second and scanned along the weld interface 3 at a speed of 500 mm/minute. A bead, which is demarcated by Bm, is formed at a portion where a pulse beam spot is applied at a center C. The bead has a diameter of 0.7 mm (twice as long as W shown in FIG. 16).

Figure 17:
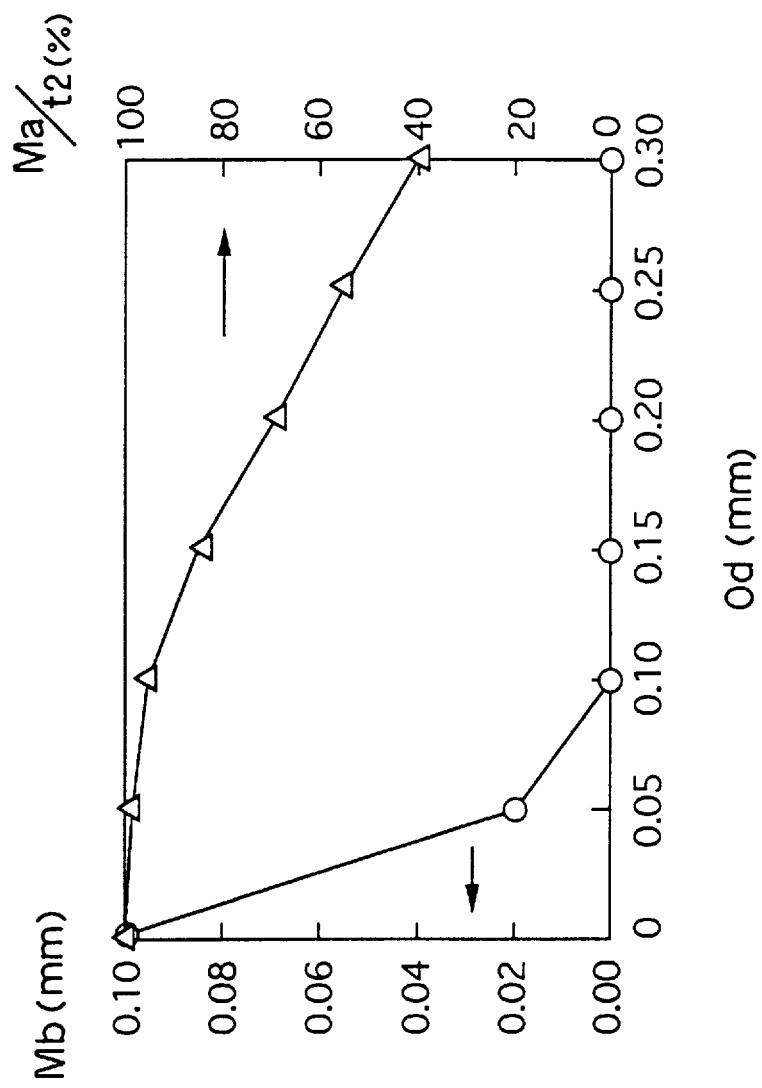
FIG. 17 is a graph showing relationship between an offset distance of the center of a laser beam spot and height of sags and also rate of the weld penetration related to the ninth embodiment.

When the spot center C is offset from the weld interface 3 toward the cover 2, the relationship between an offset distance Od (mm) of the center C and height Mb (mm) of sags and also the rate Ma/t2 (%) of the weld penetration 5 is shown in a graph in FIG. 17. In the graph, Ma is the depth of the penetration, t2 is the thickness of cover 2. It is found that when the offset distance is more than 0.06 which is 0.2 times as much as the difference (t2−t1) in the thickness between the case 1 and the cover 2, the sag becomes negligibly small. If, however, the offset distance is increased further, the depth of the penetration Ma gradually decreases to lower the bonding strength. When the offset distance od increases to be 0.8 times as much as the difference (t2−t1), that is 0.24 (mm), the rate of the weld penetration (Ma/t2) becomes about 50%.

Figure 18:
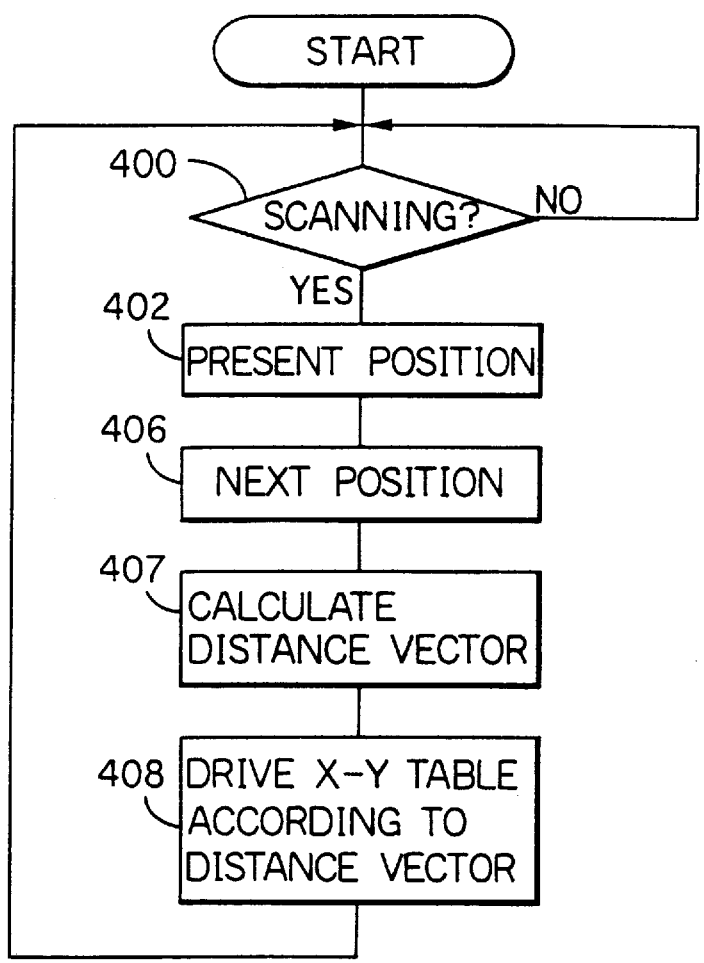
FIG. 18 is a flow chart of laser beam control in a control process 7 according to the present invention.

Control process 7:

At the beginning in a step 400 shown in FIG. 18 after the control process starts, whether the laser beam spot (focal point of the objective lens 70) is scanning the weld interface 3 or not is checked according to a program stored in the computer 8. Then, if YES, the present spot position is detected by a position sensor (not shown) in a step 402. The spot position can be detected by a scan program stored in a ROM. Such scan program controls the laser beam to scan the weld interface 3. If NO, the process returns to the starting step. Subsequently, a next position is calculated according to the present position and the scan program in a step 406. The next position is located at a suitable offset distance inside the weld interface 3 near the present position. Then, a distance vector from the present position to the next position is calculated in a step 407, and the X-Y table 6 is controlled to move according to the distance vector in a step 408.

Figure 19:
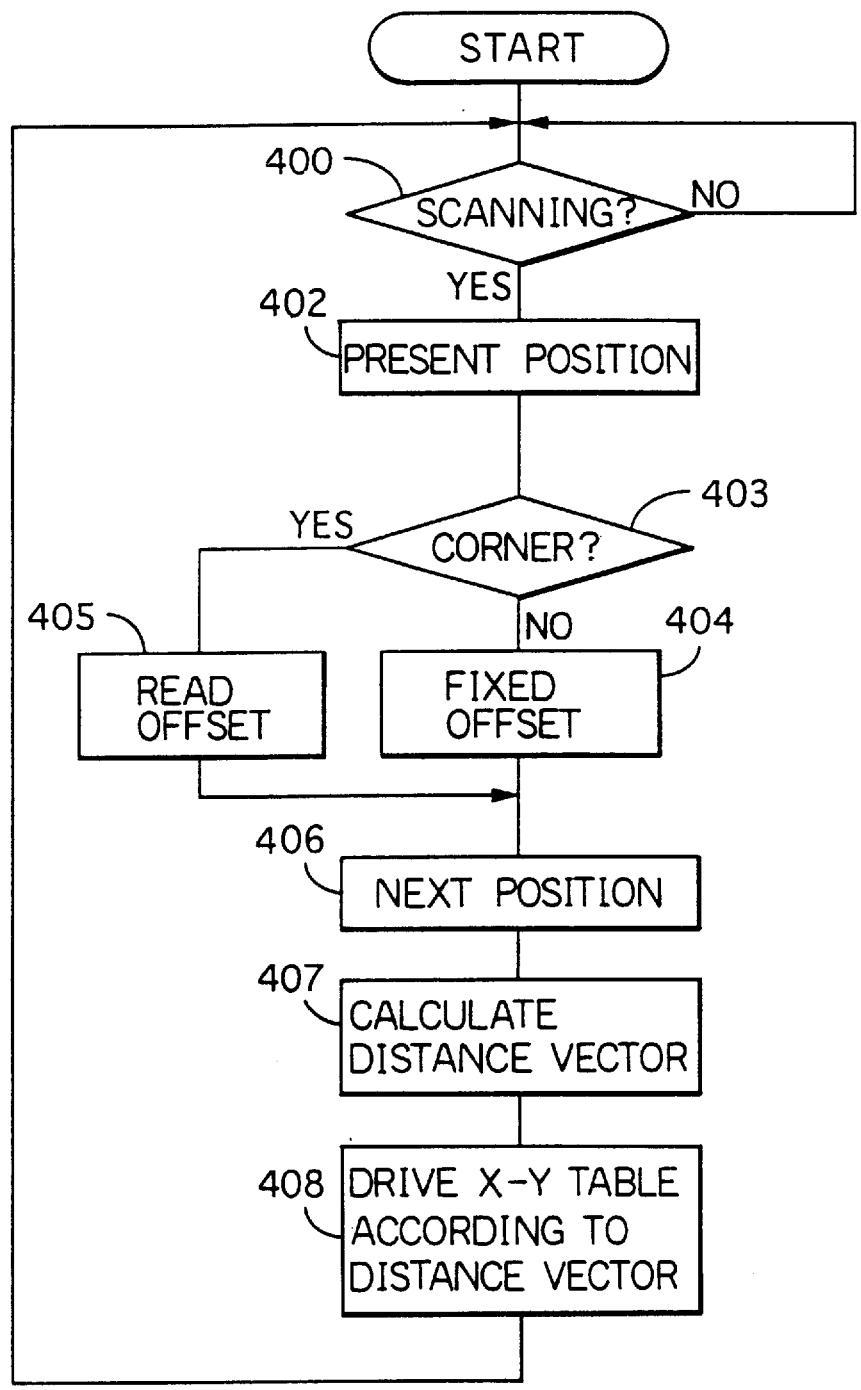
FIG. 19 is another flow chart of laser beam control in a control process 7 according to the present invention.
Figure 21:
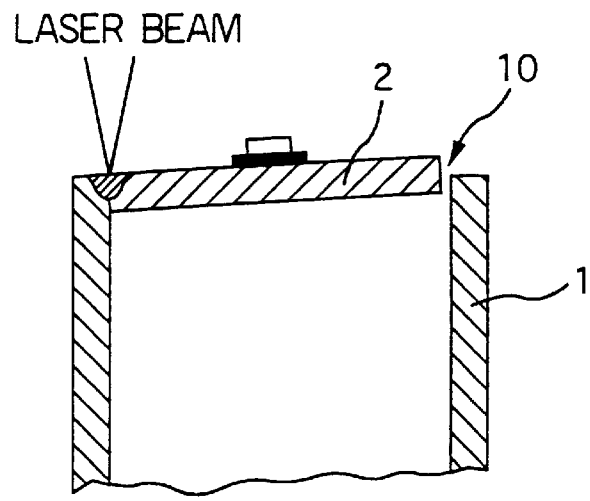
FIG. 21 is a schematic view illustrating a conventional method of welding a rectangular case of a battery.
Figure 22:
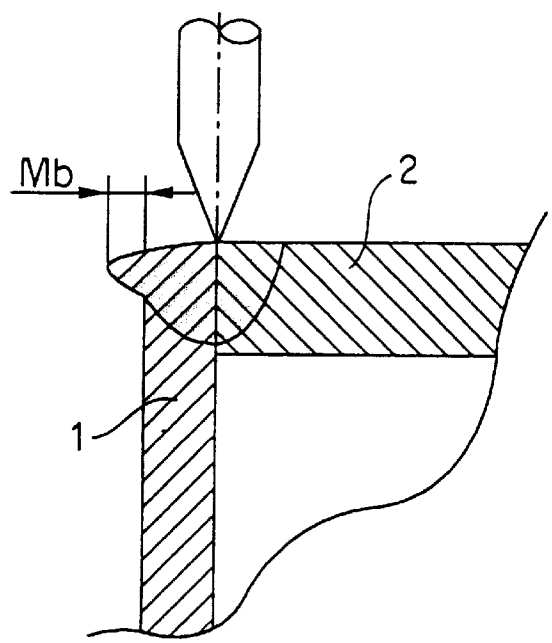
FIG. 22 is a diagrammatic view illustrating an area of weld penetration of the laser beam track of the case and the cover welded by a conventional method.

Control process 8:

Since the bottom of the V-shaped cross section of the weld penetration shifts toward the inside by itself at the corner as shown in FIG. 4 and described before, the offset distance is adjusted at the corner by adding steps 403, 404 and 405 to the Control process 7, as shown in FIG. 19.

After steps 400 and 402 (which are the same as the steps of the control process 7) in this process 8, whether the laser beam spot is located at the corner 32 or not is detected in the step 403. If NO, the offset distance is set to Lc (constant). On the other hand, if YES, the offset distance is read out from the ROM in the step 405, which is followed by steps 406, 407 and 408 (the same steps of the control process 7). The offset distance is gradually reduced as the laser beam spot approaches the center of the corner and gradually increased as the laser beam spot approaches the straight side as described before. The offset distance may be made constant all over the weld interface, however. In this case, the laser beam power is decreased at the corner to equalize the weld penetration depth in the step 405.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of manufacturing a battery having a polygonal metal case and a polygonal metal cover butted against an inner periphery of an open end of said case thereby forming a polygonal interface, having straight portions and corner portions, to be welded with said metal case, comprising the steps of:

holding said metal case;

providing a laser beam for welding the cover to the case substantially along the straight portions of the polygonal interface and substantially along a circular path having a radius of curvature smaller than that of the corner portions of the polygonal interface;

determining the location of a portion of said interface to be welded by said laser beam; and applying said laser beam to said portion to be welded when said portion to be welded is located in said straight portions, and applying said laser beam to an offset portion located substantially on said circular path when said portion to be welded is located in said corners to form a weld penetration area having substantially an equal depth along the polygonal interface.

2. A method of manufacturing a battery as claimed in claim 1, wherein said step of applying said laser beam to the offset portion comprises a step of offsetting said laser beam outside said corner of said weld interface when said laser beam leaves one of said straight sides until said laser beam turns and joins an adjacent straight side to form a corner having a radius of curvature smaller than that of said corner of said weld interface.

3. A method of manufacturing a battery as claimed in claim 1, wherein said step of holding said metal case comprises a step of securing said case on a X-Y table, and said step of applying said laser beam comprises a step of moving said X-Y table.

4. A method of manufacturing a battery as claimed in claim 1 further comprising a preparatory step of applying the laser beam to at least one straight portion of said interface for temporary setting before said step of applying said laser beam.

5. A method of manufacturing a battery as claimed in claim 4, wherein said preparatory step further comprises a step of applying said laser beam to at least one straight portion of all straight sides of the polygonal interface.

6. A method of manufacturing a battery as claimed in claim 4, wherein said preparatory step comprises steps of:

applying said laser beam to at least one straight portion on a first straight side; and applying said laser beam to at least one straight portion on a second straight side located substantially opposite from said first straight side.

7. A method of manufacturing a battery having a polygonal metal case and a polygonal metal cover butted against inner periphery of an open end of said case thereby forming a polygonal interface, having straight portions and curved portions, to be welded with said metal case comprising steps of:

(a) holding said metal case;

(b) providing a laser beam for welding the cover to the case substantially along the straight portions of the polygonal interface and substantially along a circular path having a radius of curvature smaller than that of the corner portions of the polygonal interface;

(c) determining the location of a portion of said interface to be aimed by said laser beam;

(d) determining whether said aimed portion is located in one of corner portions of said interface;

(e) controlling a position of said laser beam relative to said interface and substantially along said circular path and applying said laser beam to said aimed portion so that it receives laser power equally when said aimed portion is located in one of said straight portions or said corner portions to form a weld penetration area having an equal depth;

(f) moving said laser beam to aim at another portion of said interface; and (g) repeating said steps (a) through (f) until all said aimed portions are welded.

8. A method of manufacturing a battery as claimed in claim 7, wherein said step of controlling relative position and applying said laser beam comprises:

a step of applying said laser beam to a plurality of portions on said interface at the same time.

9. A method of manufacturing a battery as claimed in claim 8, wherein said step of applying said laser beam to said plurality of portions on said interface substantially opposite to each other at substantially the same time.

10. A method of manufacturing a battery as claimed in claim 7, wherein said step of controlling relative position and applying said laser beam to said portion comprises a step of offsetting said laser beam outside said corner of said weld interface when one of said straight sides is welded until an adjacent one of said straight sides is welded thereby forming a corner having smaller radius of curvature than said corner of said interface.

11. A method of manufacturing a battery as claimed in claim 7, wherein said step of holding comprises a step of securing said case on a X-Y table; and said step of controlling relative position of said laser beam welder comprises a step of moving said X-Y table.

12. A method of manufacturing a battery having a polygonal metal case as claimed in claim 7, further comprising a step of press-fitting said cover into said metal case.

13. A method of manufacturing a battery having a polygonal metal case and a polygonal metal cover butted against an inner periphery of an open end of said case forming a polygonal interface, having straight portions and corner portions, to be welded with said metal case, said method comprising steps of:

(a) securing said metal case to a movable platform;

(b) providing a laser beam for welding the cover to the case substantially along the straight portions of the polygonal interface and substantially along the corner portions of the polygonal interface;

(c) determining the location of a portion of said interface to be aimed by said laser beam:

(d) determining whether said aimed portion is located in one of said corner portions of said interface;

(e) varying the amount of said laser beam received by said interface when the aimed portion is located in one of said corner portions;

(f) moving said laser beam to aim at another portion of said interface; and (g) repeating said steps (a) through (f) until all said aimed portions are welded;

wherein the step (e) comprises the step of reducing the power of said laser beam when said aimed portion is located in a corner portion of the interface.

14. A method of manufacturing a battery having a polygonal metal case and a polygonal metal cover butted against an inner periphery of an open end of said case forming a polygonal interface, having straight portions and curved portions, to be welded with said metal case said method comprising steps of:

(a) securing said metal case to a movable platform:

(b) providing a laser beam for welding the cover to the case substantially along the straight portions of the polygonal interface and substantially along the corner portions of the polygonal interface;

(c) determining the location of a portion of said interface to be aimed by said laser beam;

(d) determining whether said aimed portion is located in one of said corner portions of said interface;

(e) varying the amount of said laser beam received by said interface when the aimed portion is located in one of said corner portions;

(f) moving said laser beam to aim at another portion of said interface; and (g) repeating said steps (a) through (f) until all said aimed portions are welded;

wherein said laser beam comprises repetitive pulses of laser beams and the step (e) comprises the step of increasing the time between the pulses when said aimed portion is located in a corner portion of the interface.

* * * * *